United States Patent [19]

Ganséuer

[11] Patent Number: 4,549,700
[45] Date of Patent: Oct. 29, 1985

[54] APPARATUS FOR CROPPING AND INSPECTING A SHEET-METAL COIL

[75] Inventor: Horst Ganséuer, Kreuztal, Fed. Rep. of Germany

[73] Assignee: Siemag Transplan GmbH, Netphen, Fed. Rep. of Germany

[21] Appl. No.: 563,694

[22] Filed: Dec. 20, 1983

[30] Foreign Application Priority Data

Dec. 23, 1982 [DE] Fed. Rep. of Germany ....... 3247705

[51] Int. Cl.$^4$ ...................... B65H 19/20; B21C 47/16
[52] U.S. Cl. ................................. 242/56 R; 242/78.7
[58] Field of Search ................ 242/56 R, 65, 66, 78.7; 266/48, 50, 57; 83/104, 157, 610–612, 649, 662, 355; 72/185, 464

[56] References Cited

U.S. PATENT DOCUMENTS

| 3,453,150 | 7/1969 | Murph et al. | 83/610 X |
| 3,935,775 | 2/1976 | Sato | 83/355 |
| 4,344,605 | 8/1982 | Ganseuer et al. | 266/48 |

*Primary Examiner*—Leonard D. Christian
*Attorney, Agent, or Firm*—Karl F. Ross; Herbert Dubno

[57] ABSTRACT

An apparatus for cropping and inspecting the end of a coil of sheet metal has a cradle dimensioned and oriented to support the coil with its axis horizontal, a drive for rotating the coil on the cradle about a horizontal cradle axis, a stationary lower blade spaced horizontally from the cradle, and a roller-type conveyor extending horizontally from the cradle to the lower blade. An upper blade pivotal about a horizontal blade axis toward and away from the lower blade can be pivoted down against the lower blade to sever the sheet metal between the blades. An opening element pivotal about an opening axis toward and away from the coil on the cradle can move independently of the cutter blades so as to pivot between an inner position radially engaging the coil on the cradle and an outer position immediately adjacent the conveyor. Thus when the coil is rotated about the cradle axis in a direction to unwind it and the opening element is displaced from the inner to the outer position the sheet-metal of the coil is unwound and laid on the conveyor.

9 Claims, 2 Drawing Figures

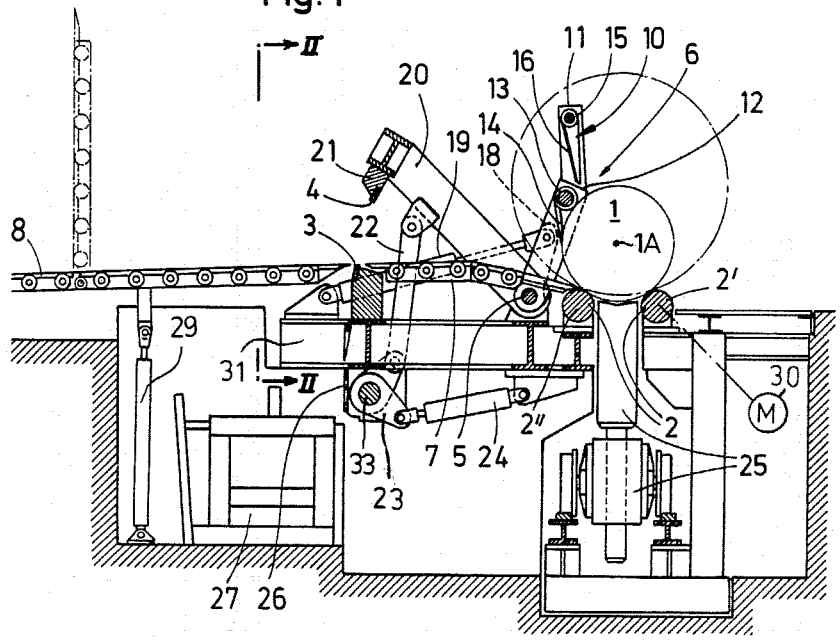

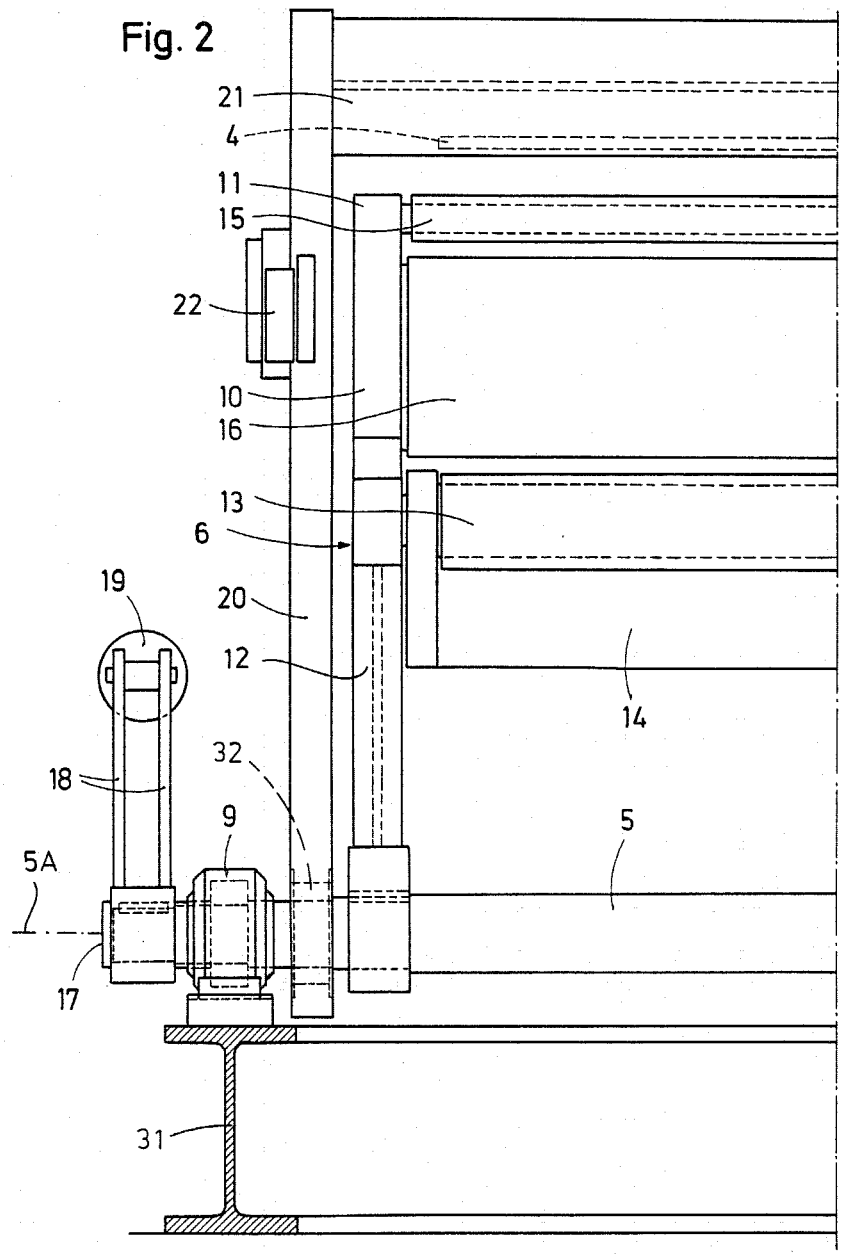

APPARATUS FOR CROPPING AND INSPECTING A SHEET-METAL COIL

FIELD OF THE INVENTION

The present invention relates to an apparatus that is used to trim and inspect the end of a piece of coiled sheet metal. More particularly this invention concerns such an apparatus used in a rolling mill to crop and grade sheet metal.

BACKGROUND OF THE INVENTION

Sheet metal is rolled up into coils at the end of its production. The ends of the material are normally somewhat ragged and must be squared. In addition it is standard to inspect the two faces of the workpiece to check their finish, and to gauge it also. Since the end of a rolled workpiece cannot be substantially different from, or at least no better than the rest of the workpiece, the cropping and inspecting operations are carried out at the same time.

Thus a machine is known which unwinds a short length of the end of the coil to allow both faces to be inspected, and which also crops off the ragged end, and even cuts off a piece for more intensive testing. Such a machine normally has a cradle on which the coil is supported and that is formed by a pair of horizontal rollers spaced apart by a distance slightly smaller than the minimum coil diameter likely to be be encountered. An opening element can engage tangentially against the coil which is rotated oppositely to the direction it is wound in so the workpiece end can be freed. A conveyor extends horizontally from this cradle to a pair of vertically spaced shear blades. As the coil is rotated in the cradle, the freed workpiece end is laid on the conveyor and forced between the blades so that it can be cropped.

In the known devices the upper and lower shear blades are carried on a frame that pivots about a horizontal axis. This frame also carries the opening element over which the workpiece strip is deflected before it passes through the narrow slot between the shear blades. The fairly stiff workpiece normally scrapes for several meters along the opening element and upper blade before flattening down on the conveyor, so that its surfaces are seriously marred, and it is very hard to grade.

In addition the lever assembly that actuates the shear is normally of complex and wear-prone construction. It must be serviced and repaired frequently, considerably adding to the operation costs of the apparatus.

OBJECTS OF THE INVENTION

It is therefore an object of the present invention to provide an improved apparatus for cropping and inspecting the end of a sheet-metal coil.

Another object is the provision of such an apparatus for cropping and inspecting a sheet-metal coil which overcomes the above-given disadvantages, that is which does not mar the workpiece surfaces and that will have a long service life.

SUMMARY OF THE INVENTION

An apparatus for cropping and inspecting the end of a coil of sheet metal according to the inventtion has a cradle dimensioned and oriented to support the coil with its axis horizontal, a drive for rotating the coil on the cradle about a horizontal cradle axis, a stationary lower blade spaced horizontally from the cradle, and a roller-type conveyor extending horizontally from the cradle to the lower blade. An upper blade pivotal about a horizontal blade axis toward and away from the lower blade can be pivoted down against the lower blade to sever any sheet metal between the blades. An opening element pivotal about an opening axis toward and away from the coil on the cradle can move independently of the cutter blades so as to pivot between an inner position radially engaging the coil on the cradle and an outer position immediately adjacent the conveyor. Thus when the coil is rotated about the cradle axis in a direction to unwind it and the opening element is displaced from the inner to the outer position, the sheet-metal of the coil is unwound and laid on the conveyor.

With this arrangement the workpiece can be treated very gently, while being accurately unwound from its coil and laid on the conveyor. Independent mounting of the cutter and opener make such action possible.

According to another feature of this invention the opening and cutter axes are generally level with the lower blade, lie between the lower blade and the cradle, and are closer to the cradle than to the lower blade. This positioning allows the cut to be made without substantial movement of the workpiece. Normally according to this invention the opening and cutter axes coincide.

The element and upper blade, in accordance with further features of this invention, are each provided with a pair of arms extending from the respective axis and flanking the conveyor. The arms of the opening element are radially shorter than those of the upper blade. In addition these arms of the opening element lie between the arms of the upper blade, and are provided with a roller extending parallel to the axes between them and lying radially outside the opening element.

For gentlest possible handling of the workpiece according to this invention a second roller bridging the arms of the element parallel to the axes radially outward from the first-mentioned roller and a deflecting plate bridging the arms between the rollers prevent anything but the workpiece end, which is going to be cut off anyhow, from touching anything but a roller. This effectively prevents the workpiece faces from being marred.

The arms of the openig element or blade are bent at the first roller and are concave downward when in the outer position. Thus each arm has a short straight inner portion and a short straight outer portion forming therewith an obtuse angle open away from the coil in the inner position of the opener.

The opening element according to this invention is a flat plate extending generally tangentially of the coil in the inner position. Since the workpiece is arched and this plate is planar and flat, only the workpiece end will scrape across it, once it is pried out from the rest of the coil.

DESCRIPTION OF THE DRAWING

The above and other features and advantages will become more readily apparent from the following, reference being made to the accompanying drawing in which:

FIG. 1 is a vertical longitudinal section through the apparatus according to this invention; and FIG. 2 is a vertical cross section in enlarged scale through the apparatus of the invention taken along line II—II of FIG. 1.

SPECIFIC DESCRIPTION

As seen in the drawing, the apparatus according to this invention acts on a coil 1 centered on a horizontal axis 1A and supported on a cradle formed by horizontal rollers 2' and 2'', the former being rotatable about its horizontal axis in either direction by a motor 30. A roller-type conveyor 7 defining an upwardly slightly convex support surface extends from adjacent the cradle 2 to a stationary lower blade 3 supported on the machine frame 31 with its cutting edge slightly below the conveyor 7. Another roller-type conveyor 8 is provided downstream of the conveyor 7, to the other side of the blade 3, and can be pivoted between a position aligned with this conveyor 7 and an up position (dot-dash lines) by means of a cylinder 29.

As also seen in FIG. 2 a main support shaft 5 centered on a horizontal axis parallel to the axis 1A but below the conveyor 7 adjacent the cradle 2 has two bearings 32 that support relatively long arms 20 whose outer ends are bridged by a bar 21 supporting an upper blade 4 that can move down past the lower blade 3 to sever a workpiece lying thereon. Each of these arms 20 is connected via a link 22 to a two-arm lever 23 pivoted on a shaft 33 and connected to a respective double-acting cylinder 24 whose other end is fixed to the frame 31. This lever 23 also acts on a deflector plate 26 that is moved between the illustrated vertical position corresponding to the illustrated up position of the blade 4 to an inclined position lying partially above a hopper 27. On the vertical position the hopper can be moved and good access is given to it.

An opening device 6 comprises a pair of arms 10 lying within the arms 20, fixed to the shaft 5, and having straight inner portions 12. These inner portions 12 have outer ends bridged by a roller 13, and an opening plate or element 14 has an outer edge tangent to this roller 13 and an inner edge that lies, in the illustrated inner position of the opening device 6, tangent to the coil 1. These arms 10 have outer portions 11 that form an obtuse angle open away from the coil 1 with the inner portions 12 and that have outer ends bridged by another deflector roller 15. A deflector plate 16 fixed between the arm portions 11 extends from an outer edge tangent to the roller 15 to an inner edge aimed tangentially at the roller 13 diametrically opposite the opening element 16.

The ends of the shaft 5 have short actuating arms 18 connected via respective double-acting cylinders 19 with the frame 31. Thus the opening device 6 can be pivoted between the illustrated inner position with the element 14 tangent to the coil 1 and the arm portions 12 upright to an outer position lying complementarily on the conveyor 7.

This arrangement functions as follows:

A truck 25 sets a coil to be cropped and inspected on the cradle 2 with the opening device 6 pivoted out of the way, the blade 4 pivoted up, the deflector plate 26 vertical, and the conveyor 8 up. The coil 1 is positioned so that its free outer end is directed clockwise as seen in FIG. 1.

The drive 30 then rotates the roller 2' to rotate the coil 1 clockwise, and the actuators 19 move the opening device 6 into the illustrated inner position. This brings the scraper or opening element 14 into light tangential engagement with this coil, so that when its free end comes to the lower edge of the element 14 it is forced out, moving along this element 14.

As soon as this happens the cylinders 19 contract slowly while the coil 1 continues to rotate fairly slowly. The free workpiece end rides along the plate 14, then rolls on the roller 13, engages against the plate 16, and eventually rides over the outer deflector roller 15. Before the workpiece end reaches the roller 15, however, the opening device 6 has moved all the way out and down to lay the workpiece on the conveyor 7, guiding the free end through the gap between the lower blade 3 and the raised upper blade 4. The drive 30 stops when a short piece of the workpiece projects past the blade 3. Only the workpiece end rubs on the plates 14 and 16, otherwise the workpiece only engages the rollers 13 and 15 on the top and the rollers of the conveyor 7 on the bottom, so that its surfaces will not be marred at all.

The cylinders 24 are then expanded to bring the blade 4 down and crop off the workpiece end. The thus severed end falls down and is deflected by the flap 26 into the hopper 27.

Then the conveyor 8 is brought down and the blade 4 is raised up again, and the motor 30 starts to feed a short section of the workpiece out onto the inspection area formed by the conveyor 8. The top surface, which is the inside workpiece surface on the coil 1, can then be inspected.

If desired, the cylinders 24 can expand again to cut off the end portion for closer examination.

Once these operations are complete, the motor 30 is reversed to wind the workpiece back up, whereupon the carriage 25 can move it out of the apparatus.

Thus the workpiece is treated gently, yet can be cropped, inspected, and even sampled. The cylinders 24 and 19 are independently controlled, as are the various other actuators and drives, making the machine very flexible in the operations it can carry out.

I claim:

1. An apparatus for cropping and inspecting the end of a coil of sheet metal, the apparatus comprising:
    a cradle dimensioned and oriented to support the coil with its axis horizontal;
    winding means for rotating the coil on the cradle about a horizontal cradle axis;
    a stationary lower blade spaced horizontally from the cradle;
    a roller-type conveyor extending horizontally from the cradle to the lower blade;
    an upper blade pivotal disposed above said lower blade; arm means carrying said upper blade for mounting same to pivot about a horizontal blade axis toward and away from the lower blade;
    cutter means connected to the upper blade for pivoting same down against the lower blade and thereby severing sheet metal between the blades;
    an opening element pivotal about an opening axis toward and away from the coil on the cradle;
    opening means independent of the cutter means and connected to the opening element for pivoting same between an inner position radially engaging the coil on the cradle and an outer position immediately adjacent the conveyor, whereby when the coil is rotated about the cradle axis in a direction to unwind it, and the opening element is displaced from the inner to the outer position, the sheet-metal of the coil is unwound and laid on the conveyor, the opening and cutter axes being generally level with the lower blade, lying between the lower blade and the cradle, and being closer to the cradle than to the lower blade.

2. The coil-cropping and -inspecting apparatus defined in claim 1 wherein the opening and cutter axes coincide.

3. The coil-cropping and -inspecting apparatus defined in claim 2 wherein the opening element and upper blade each are provided with a pair of arms extending from the respective axis and flanking the conveyor.

4. The coil-cropping and -inspecting apparatus defined in claim 3 wherein the arms of the opening element are radially shorter than those of the upper blade.

5. The coil-cropping and -inspecting apparatus defined in claim 4 wherein the arms of the opening element lie between the arms of the upper blade.

6. The coil-cropping and -inspecting apparatus defined in claim 4 wherein the arms of the opening element are provided with a roller extending parallel to the axes between them and lying radially outside the opening element.

7. The coil-cropping and -inspecting apparatus defined in claim 6, further comprising:
 a second roller bridging the arms of the element parallel to the axes radially outward from the first-mentioned roller; and
 a deflecting plate bridging the arms between the rollers.

8. The coil-cropping and -inspecting apparatus defined in claim 7 wherein the arms of the element are bent at the first roller and are concave downward when in the outer position.

9. The coil-cropping and -inspecting apparatus defined in claim 8 wherein the opening element is a flat plate extending generally tangentially of the coil in the inner position.

* * * * *